United States Patent
Kusuda et al.

(10) Patent No.: US 7,387,517 B2
(45) Date of Patent: Jun. 17, 2008

(54) CONNECTOR MOUNTING STRUCTURE

(75) Inventors: Kiyonori Kusuda, Kawasaki (JP); Hisato Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/896,265

(22) Filed: Aug. 30, 2007

(65) Prior Publication Data

US 2008/0070439 A1    Mar. 20, 2008

(30) Foreign Application Priority Data

Sep. 20, 2006    (JP)    ............................. 2006-254428

(51) Int. Cl.
    *H01R 12/00*    (2006.01)
(52) U.S. Cl. .................................... 439/79; 439/541.5
(58) Field of Classification Search ................. 439/79, 439/541.5
    See application file for complete search history.

(56) References Cited

U.S. PATENT DOCUMENTS

| | | | | |
|---|---|---|---|---|
| 5,772,453 A | * | 6/1998 | Tan et al. ...................... | 439/79 |
| 5,954,523 A | * | 9/1999 | Babcock ....................... | 439/79 |
| 6,991,471 B2 | | 1/2006 | Hayashi et al. | |
| 7,326,067 B2 | * | 2/2008 | Karamooz ................... | 439/79 |
| 2001/0049212 A1 | * | 12/2001 | Arnett ......................... | 439/79 |
| 2003/0171014 A1 | * | 9/2003 | Lin .............................. | 439/79 |

FOREIGN PATENT DOCUMENTS

JP    2005-116751    4/2005

* cited by examiner

*Primary Examiner*—Tho D Ta
(74) *Attorney, Agent, or Firm*—Staas & Halsey LLP

(57) ABSTRACT

In a connector mounting structure, a printed-wiring board has a cut portion, a modular connector connecting pattern provided adjacent to the cut portion, and a connecting pattern provided isolated from the modular connector connecting pattern and connecting an SFP connector. Also, the printed-wiring board and a front board are combined in order that the cut portion faces a plane of an opening which the front board has. When a modular connector is inserted into the opening, the modular connector is supported by the opening and the cut portion and concurrently the modular connector is electrically contacted with the modular connector connecting pattern. When an SFP front cage is inserted into the opening, the SFP front cage is supported by the opening and the cut portion and concurrently an SFP module becomes connectable to the SFP connector through the SFP front cage.

8 Claims, 22 Drawing Sheets

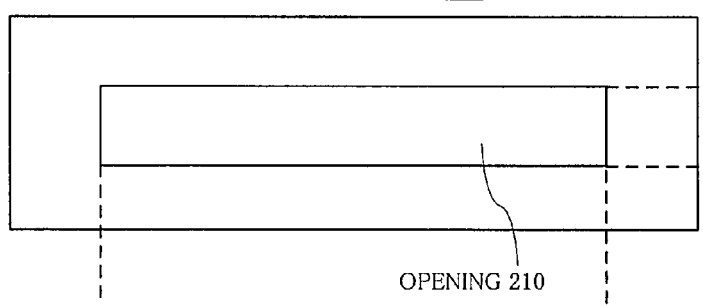
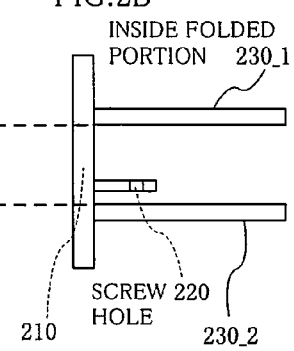
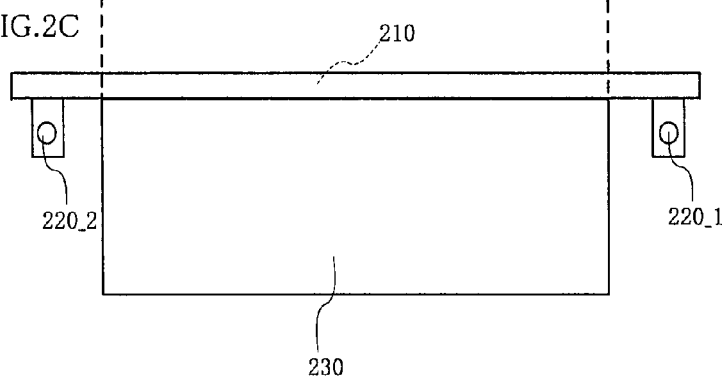

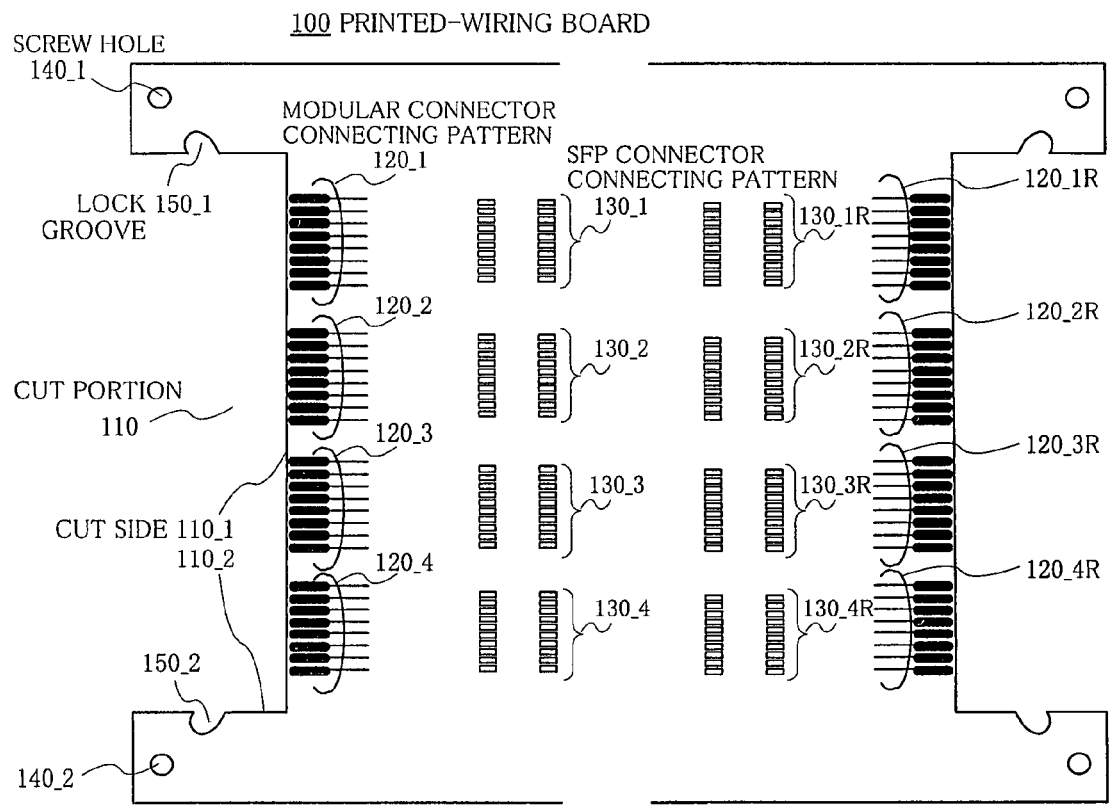
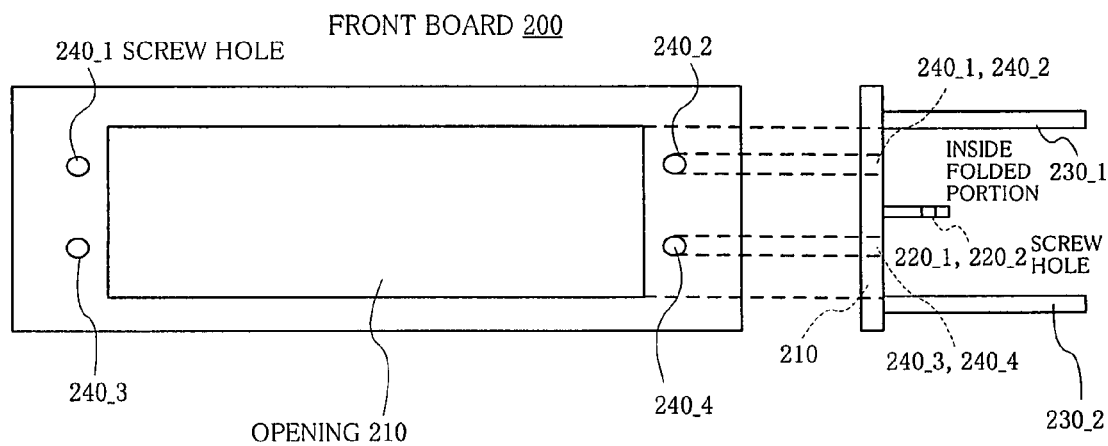

200 FRONT BOARD
100 PRINTED-WIRING BOARD
MODULAR CONNECTOR 300

200 FRONT BOARD
100 PRINTED-WIRING BOARD
SFP FRONT CAGE 400
600 SFP CONNECTOR

CONNECTOR MOUNTING STRUCTURE

BACKGROUND OF THE INVENTION

1. Field of the Invention

The present invention relates to a connector mounting structure, and in particular to a connector mounting structure for connecting a modular connector or an SFP connector to a printed-wiring board.

2. Description of the Related Art

As the above-mentioned connector mounting structure, e.g. a plug-in unit 1 shown in FIG. 19 has been known. This plug-in unit 1 connects a connector 3 which functions as a communication interface for a communication device 2, electric equipment (now shown), and the like mounted to a printed-wiring board 100, and enables the connector 3 to be connected to an external device through a front board 200 fixed to the printed-wiring board 100.

For the above-mentioned connector 3, various ones are used according to communication purposes. Specifically in the Internet communication or the like, a modular connector of an RJ-45 type or the like is generally used. In such a case that a communication distance, a communication capacity, or the like is high, an SFP (Small Form-Factor Pluggable) connector for an optical communication is widely adopted.

Prior art examples [1] and [2] of a mounting technology of the modular connector and the SFP connector will now be described referring to FIGS. 20A-20D, 21A-21D, 22A, and 22B.

PRIOR ART EXAMPLE [1]

(Mounting Example of Modular Connector): FIGS. 20A-20D

A modular connector 300 shown in FIGS. 20A and 20B has a slot 310 of a modular plug (not shown), a contact portion 340 which contacts with the front board 200, and a lead 360 connected to the printed-wiring board 100.

In an assembling process, as shown in FIG. 20C, the lead 360 of the modular connector 300 is firstly inserted into a through-hole 160 provided on the printed-wiring board 100 to be connected by soldering.

As shown in FIG. 20D, the front board 200 is fitted and fixed to the front side of the modular connector 300. At this time, the contact portion 340 electrically contacts with the front board 200, thereby enabling an EMC (Electro-Magnetic Compatibility) function to be achieved.

PRIOR ART EXAMPLE [2]

(Mounting Example of SFP Connector and Cage): FIGS. 21A-21D

FIGS. 21A and 21B show an SFP cage 800 which circumferentially supports an SFP connector 600 and an SFP module (not shown) connected to the SFP connector 600.

The SFP cage 800 is structured so that when the SFP module is plugged from a slot 810 to be connected to the SFP connector 600, a plate spring 820 generates repulsion which pushes back the SFP module to the slot 810 side, so that a lock 830 latches the SFP module pushed back to be reliably connected to the SFP connector 600.

In an assembling process, as shown in FIG. 21C, the SFP connector 600 is firstly mounted on the printed-wiring board 100 to be connected, and then a lead 840 of the SFP cage 800 is inserted into the through-hole 160 provided on the printed-wiring board 100 to be soldered.

As shown in FIG. 21D, the front board 200 is fitted and fixed to a front side of the SFP cage 800. Thus, a contact portion 850 electrically contacts with the front board 200, thereby enabling the EMC function to be achieved in the same way as the above-mentioned prior art example [1].

The following reference example can be mentioned: The SFP cage 800 is divided into two cages, and one cage is made removable from the other cage in order to improve deterioration of maintainability due to an operation of removing the whole plug-in unit 1 shown in FIG. 19 from the communication device 2, an operation of inserting and extracting a cable connected to the SPF module, or the like upon examining a maintenance. Also, the cage on the front board 200 side and the front board 200 are integrated, so that only a part of the plug-in unit 1 can be taken out from the communication device 2 without inserting or extracting the cable (see e.g. patent document 1).

Also, when both of the modular connector 300 shown in the above-mentioned prior art example [1] and the SFP connector 600 shown in the above-mentioned prior art example [2] are required to be consolidated and mounted, as shown in FIG. 22A, a printed-wiring board 100_1 mounting thereon the modular connector 300 and a printed-wiring board 100_2 mounting thereon the SFP cage 800 which incorporates the SFP connector 600 are both mounted on the communication device 2. When more connectors are further required, as shown in FIG. 22B, a modular connector 300D and an SFP cage 800D in which the modular connector 300 and the SFP cage 800 are structured in two tiers respectively are mounted on the printed-wiring boards 100_and 100_2.

[Patent document 1] Japanese Patent Application Laid-Open No. 2005-116751

In the above-mentioned prior art examples [1] and [2], there has been a problem that the modular connector and the SFP connector are respectively mounted on specific printed-wiring boards, the printed-wiring boards are required to be exchanged when a communication purpose (namely, either a modular connector or an SFP connector is used) is changed, and another member which composes a printed-wiring board and a plug-in unit has to be prepared per connector in a designing process.

Also, there has been a problem that when an operation using both of the modular connector and the SFP connector is supposed, at least two printed-wiring boards are required to be preliminarily mounted on the communication device, the electronic equipment, or the like regardless of whether or not both are concurrently used, which prevents high-density mounting.

SUMMARY OF THE INVENTION

It is accordingly an object of the present invention to provide a connector mounting structure which enables a modular connector and an SFP connector to be alternatively or concurrently connected to a common printed-wiring board.

[1] In order to achieve the above-mentioned object, a connector mounting structure according to one aspect of the present invention comprises: a printed-wiring board having a cut (or notched) portion, a modular connector connecting pattern provided adjacent to the cut portion, and an SFP connector mounted isolated from the modular connector connecting pattern; and a front board having an opening, and combined with the printed-wiring board in order that the cut portion faces a plane of the opening; wherein when a modular connector is inserted into the opening, the modular connector is supported by the opening and the cut portion and concurrently the modular connector is electrically contacted with the modular connector connecting pattern, and when an SFP front cage is inserted into the opening, the SFP front cage is supported by the opening and the cut portion and concurrently an SFP module becomes connectable to the SFP connector through the SFP front cage.

Namely, the present invention has been invented by drawing attention on a difference in lengths between a modular connector and an SFP module connected to an SFP connector. A printed-wiring board on which the modular connector connecting pattern is preliminarily provided and the SFP connector is mounted is prepared. Even when either the modular connector or an SFP front cage supporting the SFP module is inserted into an opening of a front board, the modular connector or the SFP front cage is supported by a cut (or notched) portion of the printed-wiring board and the opening.

Thus, it is not necessary to exchange a printed-wiring board even if a communication purpose or application is changed, so that it is possible to alternatively mount both of the modular connector and the SFP connector.

While the SFP cage is mounted on the printed-wiring board and then the front board is fitted in the assembling process of the above-mentioned prior art example [2], there has been a case where the cage is deformed or broken according to a position adjustment upon fitting the front board, since the thickness of the SFP cage is thin and its strength is lower compared with that of the front board.

However, the front board is combined with the printed-wiring board and then the SFP front cage is inserted into the opening in the present invention. Therefore, the position adjustment with the front board is easy, and the deformation and the breakage of the cage can be prevented.

[2] Also, in the above-mentioned [1], the printed-wiring board may have the modular connector connecting pattern and the SFP connector on each side of the printed-wiring board, and the cut portion may face a center line of the opening, thereby enabling a stack structure of the modular connector and the SFP front cage or a two-tier structure of the modular connector or the SFP front cage integrated.

Namely, by facing the cut portion to a center line of the opening, it becomes possible to insert the modular connector or the SFP front cage into each side of the printed-wiring board.

Since the modular connector and the SFP front cage combined to form a stack structure can be concurrently inserted into different sides of a single printed-wiring board in this case, the number of printed-wiring boards mounted on a communication device, an electronic device, and the like can be reduced, thereby enabling high-density mounting.

Also, the modular connector or the SFP front cage integrated to form a two-tier structure can be alternatively inserted into each side of the printed-wiring board without exchanging the printed-wiring boards. Therefore, it is possible to mount much more modular connectors and SFP connectors on a common printed-wiring board.

[3] Also, in the above-mentioned [1], the cut portion may have a lock groove, and the cut portion may support the modular connector or the SFP front cage by fitting a lock provided either in the modular connector or the SFP front cage to the lock groove.

[4] Also, in the above-mentioned [1], the front board may be combined with the modular connector or the SFP front cage by a combining member.

Namely, in the above-mentioned [3] or [4], the modular connector or the SFP front cage can be fixed more reliably.

[5] Also, in the above-mentioned [1], the modular connector or the SFP front cage may have a contact portion which is electrically contactable with the opening.

Namely, in this case, the EMC function can be achieved in the same way as the above-mentioned prior art examples [1] and [2].

[6] Also, in the above-mentioned [1], an SFP back cage which supports the SFP module circumferentially when the SFP module is connected to the SFP connector may be further mounted on the printed-wiring board.

Namely, in this case, it is possible to connect the SFP module to the SFP connector more reliably.

Since the SFP module is also supported by the SFP front cage shown in the above-mentioned [1], the SFP back cage has only to support the SFP module in the vicinity of the SFP connector, which leads to downsizing. Thus, when the SFP back cage is mounted on the printed-wiring board, a cage can be made a surface mounting type cage where a lead is not required to be inserted into a through-hole in the same way as the above-mentioned prior art example [2], and heat capacity upon soldering can be reduced.

[7] Also, in the above-mentioned [6], the SFP back cage may have a plate spring generating repulsion which pushes back the SFP module toward the SFP front cage, and the SPF front cage may have a lock which latches the SFP module pushed back by the repulsion.

Namely, even when the cage supporting the SFP module is divided, the SFP module can be reliably connected to the SFP connector in the same way as the above-mentioned prior art example [2].

[8] Also, in the above-mentioned [6], the SFP connector may have a lead to be soldered to the printed-wiring board, and the SFP back cage may have a window for examining whether or not the lead is soldered to the printed-wiring board.

According to the present invention, the modular connector and the SFP connector can be connected to the common printed-wiring board, thereby enabling a manufacturing cost to be reduced since designing the printed-wiring board per connector is not necessary and the number of structuring members for the plug-in unit to be prepared can be reduced.

Also, high-density mounting of the modular connector and the SFP connector is realized, thereby enabling a communication device and the like to which the connectors are applied to be downsized.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 2A-2C are diagrams showing an arrangement of a front board used for an embodiment [1] of a connector mounting structure according to the present invention;

FIGS. 11A-11D are diagrams showing an arrangement of a printed-wiring board and a front board used for an embodiment [2] of a connector mounting structure according to the present invention;

DETAILED OF THE EMBODIMENTS

Embodiments [1]-[3] of a connector mounting structure according to the present invention will now be described referring to FIGS. 1A, 1B, 2A-2C, 3A-3D, 4, 5A-5D, 6A, 6B, 7, 8A-8C, 9A, 9B, 10, 11A-11D, 12A-12C, 13, 14A, 14B, 15A-15D, 16, 17A-17C, and 18.

I. Embodiment [1] (Alternative Mounting of Either Modular Connector or SFP Front Cage): FIGS. 1A, 1B, 2A-2C, 3A-3D, 4, 5A-5D, 6A, 6B, 7, 8A-8C, 9A, and 9B Hereinafter, an embodiment of a connector mounting structure which alternatively mounts thereon a modular connector or an SFP front cage will be described. Firstly, a common assembling process example (1) according to a printed-wiring board, an SFP connector, a front board, and an SFP back cage which compose a connector mounting structure of this embodiment will be described referring to FIGS. 1A, 1B, 2A-2C, and 3A-3D.

Then, an assembling process example (2) in a case where the modular connector is mounted in the common assembling process example (1) will be described referring to FIGS. 4, 5A-5D, 6A, and 6B. Then, an assembling process example (3) in a case where the SFP front cage is mounted will be described referring to FIGS. 7, 8A-8C, 9A, and 9B.

I.1. Common Assembling Process Example (1): FIGS. 1A, 1B, 2A-2C, and 3A-3D

Figure 1A:
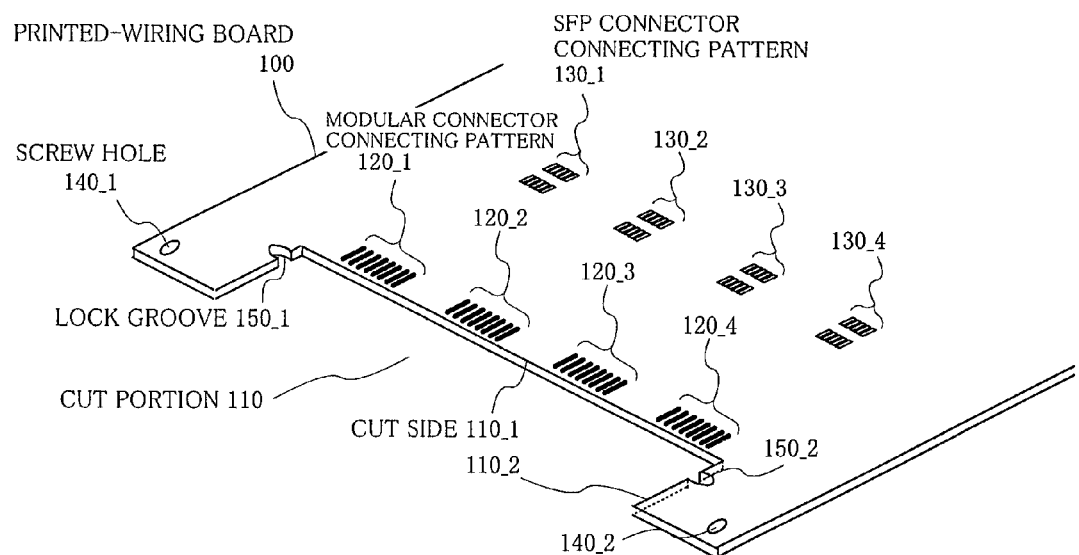
FIGS. 1A and 1B are diagrams showing a common assembling process example (1) of an embodiment [1] of a connector mounting structure according to the present invention.

A printed-wiring board 100 used in this embodiment has, as shown in FIG. 1A, a cut portion 110 where an edge (one side) of the printed-wiring board 100 is cut forming a concave shape, four modular connector connecting patterns 120_1-120_4 (hereinafter, occasionally represented by a reference numeral 120) provided adjacent to a cut side 110_1 of the cut portion 110 and in the horizontal direction shown in FIG. 1A on the printed-wiring board 100, four SFP connector connecting patterns 130_1-130_4 (hereinafter, occasionally represented by a reference numeral 130) respectively provided isolated from the modular connector connecting patterns 120_1-120_4 by a difference in length between the modular connector and an SFP module, in the same direction as the connecting patterns 120_1-120_4, two screw holes 140_1 and 140_2 provided on corners of the printed-wiring board 100, and lock grooves 150_1 and 150_2 (hereinafter, occasionally represented by a reference numeral 150) provided on both cut sides 110_2 of the cut portion 110.

Figure 1B:
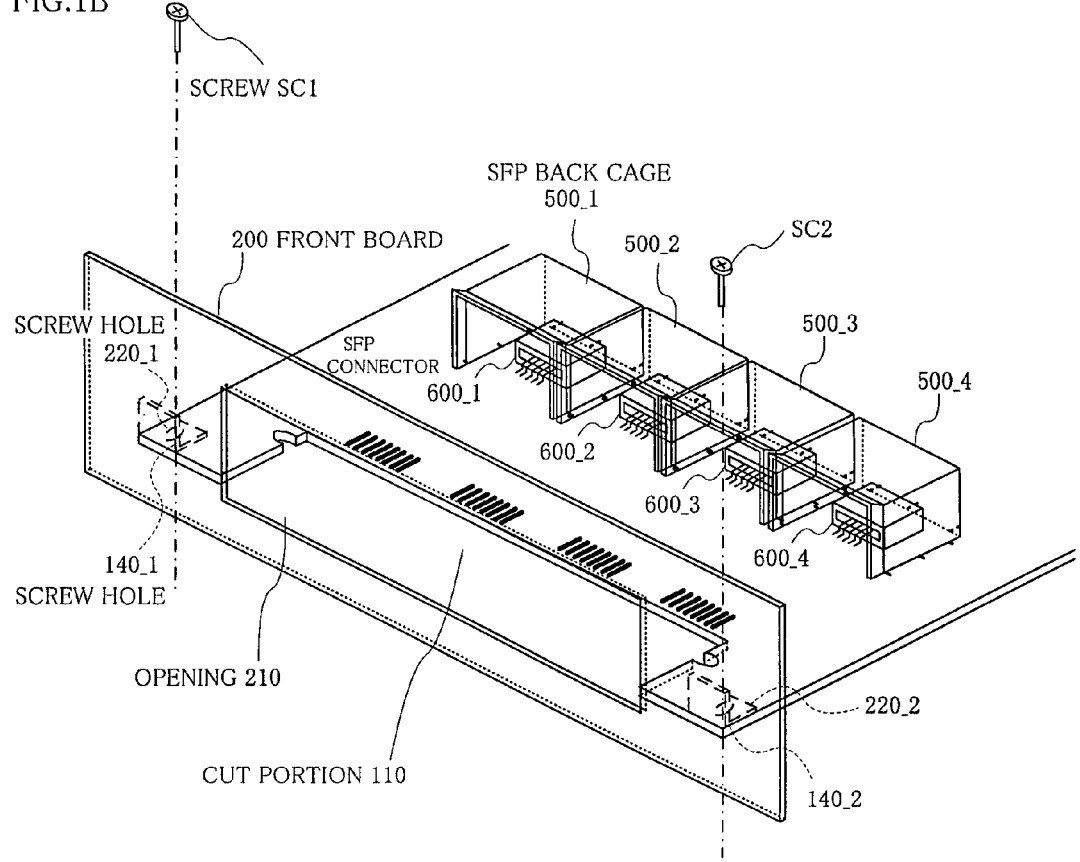

In the assembling process, as shown in FIG. 1B, SFP connectors 600_1-600_4 (hereinafter, occasionally represented by a reference numeral 600) are firstly mounted on the SFP connector connecting patterns 130_1-130_4 respectively to be connected and attached.

The screw holes 140_1 and 140_2 of the printed-wiring board 100 are combined with screw holes 220_1 and 220_2 (hereinafter, occasionally represented by a reference numeral 220) of a front board 200 by screws SC1 and SC2 as an example.

The screw holes 220 are provided so as to be located between inside folded portions 230_1 and 230_2 (hereinafter, occasionally represented by a reference numeral 230) provided on the top and the bottom of an opening 210 of the front board 200 as shown in FIGS. 2A-2C, so that the cut portion 110 of the printed-wiring board 100 faces a plane of the opening 210 as shown in FIG. 1B.

SFP back cages 500_1-500_4 (hereinafter, occasionally represented by a reference numeral 500) are mounted on the printed-wiring board 100 so as to cover the SFP connectors 600_1-600_4 in their vicinities to be fixed by soldering.

It is to be noted that the SFP back cages 500 are not essential for the connection of the SFP connectors 600, and that the SFP back cages 500 may be attached when the SFP modules are required to be more strongly connected to the SFP connectors 600.

Figure 3A:
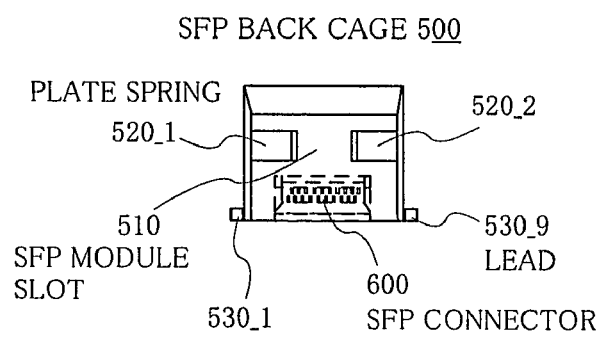
FIGS. 3A-3D are diagrams showing an arrangement of an SFP back cage used for a connector mounting structure according to the present invention.
Figure 3B:
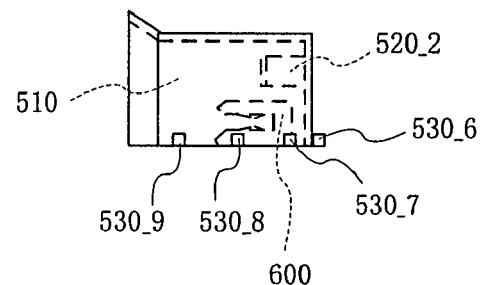
Figure 3C:
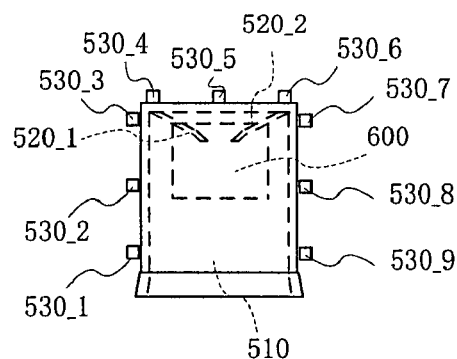

Plate springs 520_1 and 520_2 (hereinafter, occasionally represented by a reference numeral 520) generating repulsion which pushes back the SFP module inserted into a slot 510 may be provided to the SFP back cage 500 as shown in FIGS. 3A-3C.

Also, leads 530_1-530_9 (hereinafter, occasionally represented by a reference numeral 530) are provided so as to face both sides and a back surface except the side of the slot 510 (namely, so as to be horizontal to the printed-wiring board 100), as shown in FIG. 3C, on the SFP back cage 500, so that surface mounting is enabled without providing a through-hole on the printed-wiring board 100, different from the prior art SFP cage shown in FIGS. 21A-21D.

Figure 3D:
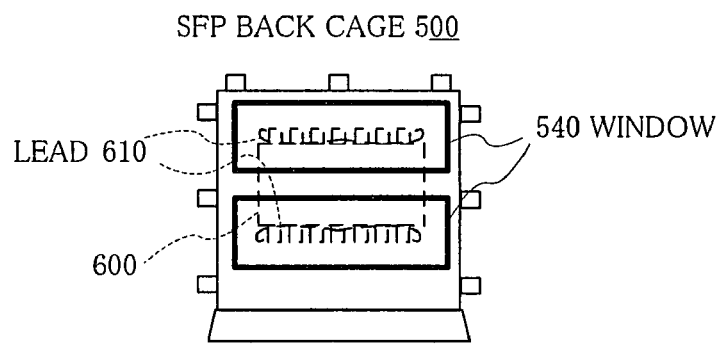
Figure 4:
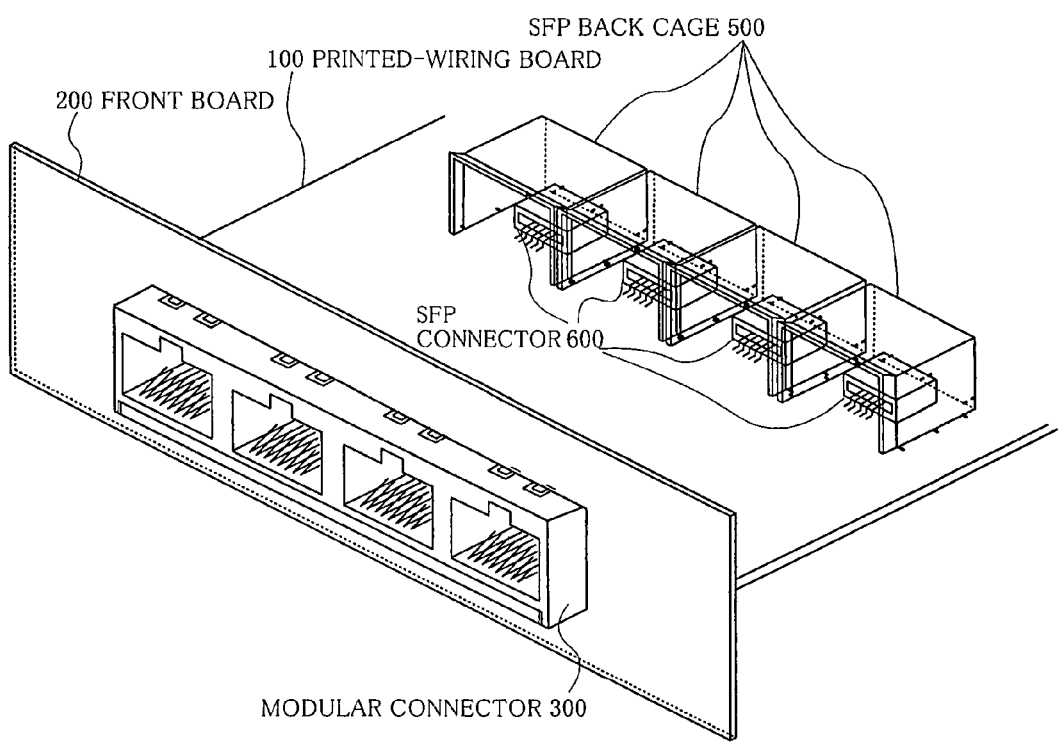
FIG. 4 is a diagram showing a modular connector mounting example of an embodiment [1] of a connector mounting structure according to the present invention.

Also, as shown in FIG. 3D, a window 540 may be provided on the SFP back cage 500 in order to examine whether or not a lead 610 of the SFP connector 600 is soldered to the SFP connector connecting pattern 130 of the printed-wiring board 100.

I. 2. Assembling Process Example (2) Upon Mounting Modular Connector: FIGS. 4, 5A-5D, 6A, and 6B FIG. 4 shows a state where a modular connector 300 is inserted into the opening 210 of the front board 200 after the assembling work described in the common assembling process example (1) of FIGS. 1A and 1B. It is to be noted that the SFP connector 600 is not used in this state.

The modular connector 300 is composed of, as shown in FIGS. 5A-5D as an example, contact pins 320_1-320_4 (hereinafter, occasionally represented by a reference numeral 320) for electrically connecting modular plugs (not shown) inserted into four slots 310_1-310_4 respectively to the modular connector connecting patterns 120_1-120_4 of the printed-wiring board 100, locks 330_1 and 330_2 (hereinafter, occasionally represented by a reference numeral 330) provided so as to be able to fit the lock grooves 150_1 and 150_2 respectively, and four contact portions 340_1-340_4 (hereinafter, occasionally represented by a reference numeral 340) provided corresponding to the slots 310_1-310_4 and for electrically contacting with the front board 200.

Figure 5A:
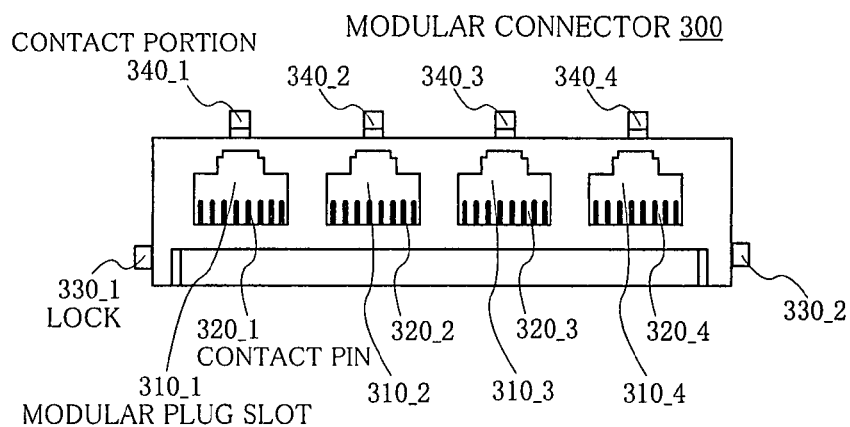
FIGS. 5A-5D are diagrams showing an arrangement of a modular connector used for an embodiment [1] of a connector mounting structure according to the present invention.
Figure 5B:
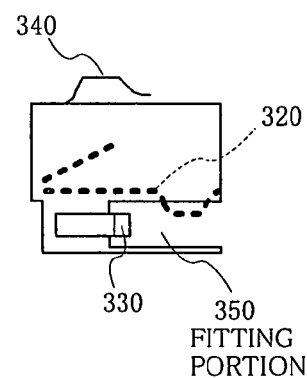
Figure 5C:
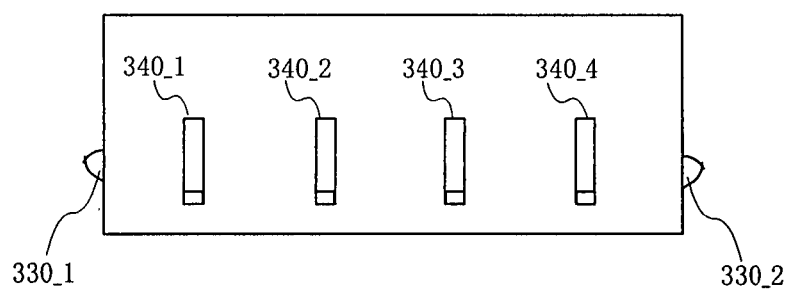
Figure 5D:
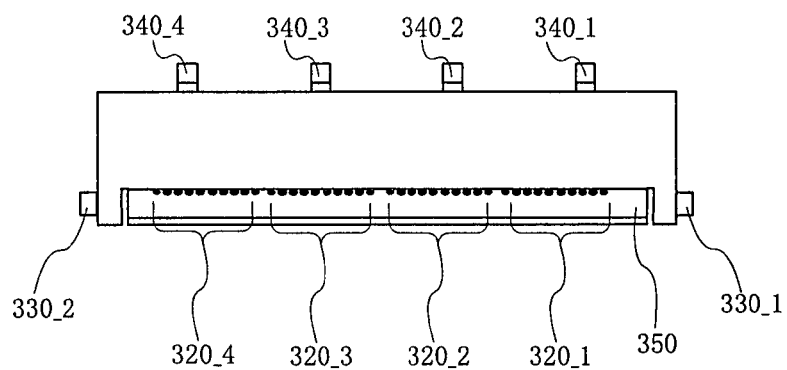

Also, as shown in FIG. 5B, the modular connector 300 has a concave fitting portion 350 to be fitted to the printed-wiring board 100, and a part of the contact pin 320 is pulled out from the top surface of the fitting portion 350 so as to be contactable with the modular connector connecting pattern 120.

Figure 6A:
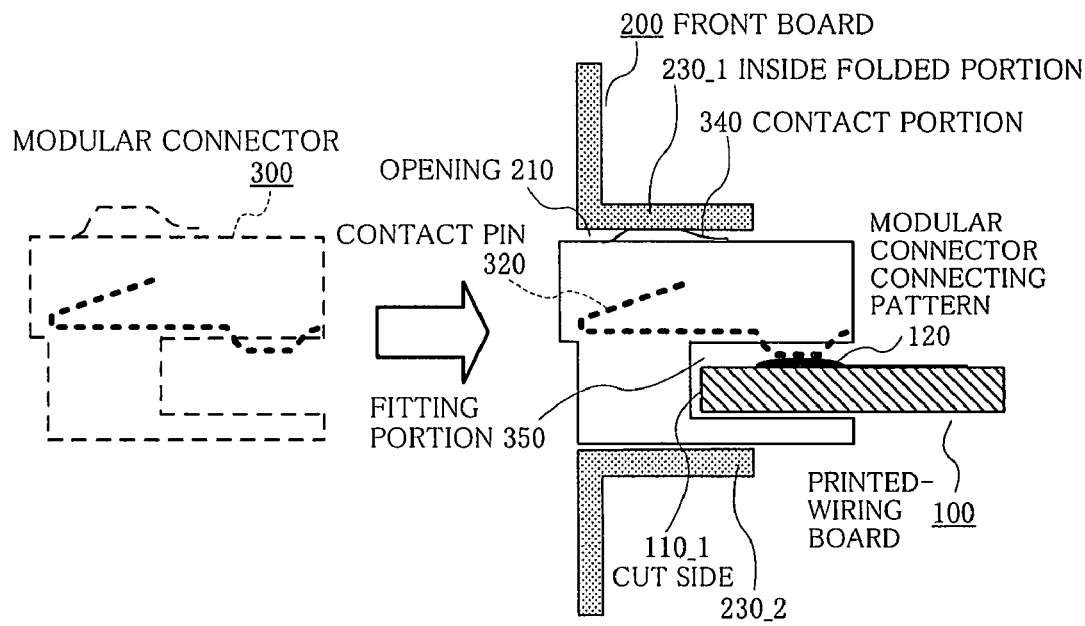
FIGS. 6A and 6B are diagrams showing an assembling process example (2) of an embodiment [1] of a connector mounting structure according to the present invention.

In the assembling process, as shown in FIG. 6A, when the modular connector 300 is inserted into the opening 210 of the front board 200, the fitting portion 350 sandwiches the printed-wiring board 100 and abuts on the cut side 110_1 of the printed-wiring board 100, so that the modular connector 300 is supported by the cut portion 110 in the horizontal direction in which the printed-wiring board 100 is extended. As for the vertical direction, the inside folded portions 230_1 and 230_2 of the opening 210 support the modular connector 300 to be sandwiched from above and below.

It is to be noted that while the fitting portion 350 supports the modular connector 300 by sandwiching the printed-wiring board 100, the fitting portion 350 is not essential for the support of the modular connector 300. The modular connector 300 may have any form at least capable of abutting on the cut side 110_1 of the printed-wiring board 100.

At this time, as shown in FIG. 6A, a state where the contact pin 320 electrically contacts with the modular connector connecting pattern 120, and the contact portion 340 electrically contacts with the front board 200 is assumed, so that the EMC function is achieved.

It is to be noted that while the inside folded portion 230_1 of the front board 200 supports the modular connector 300 by sandwiching the modular connector 300 through the contact portion 340 in the state shown in FIG. 6A, the contact portion 340 is not essential for the support of the modular connector 300 and may be provided in a case where the EMC function is required to be achieved.

Figure 6B:
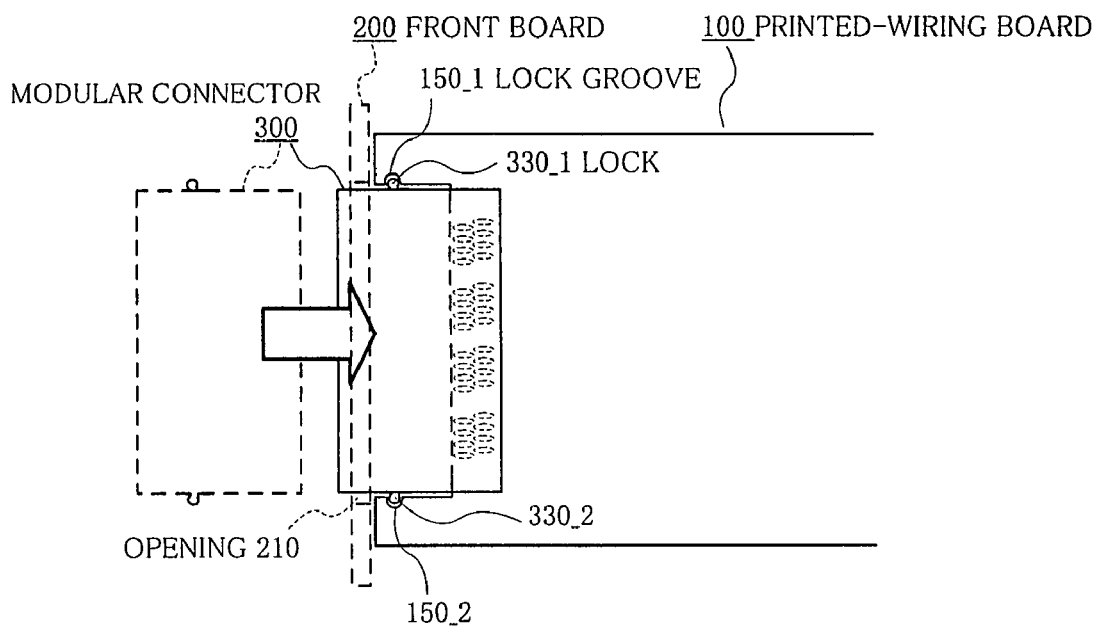
Figure 7:
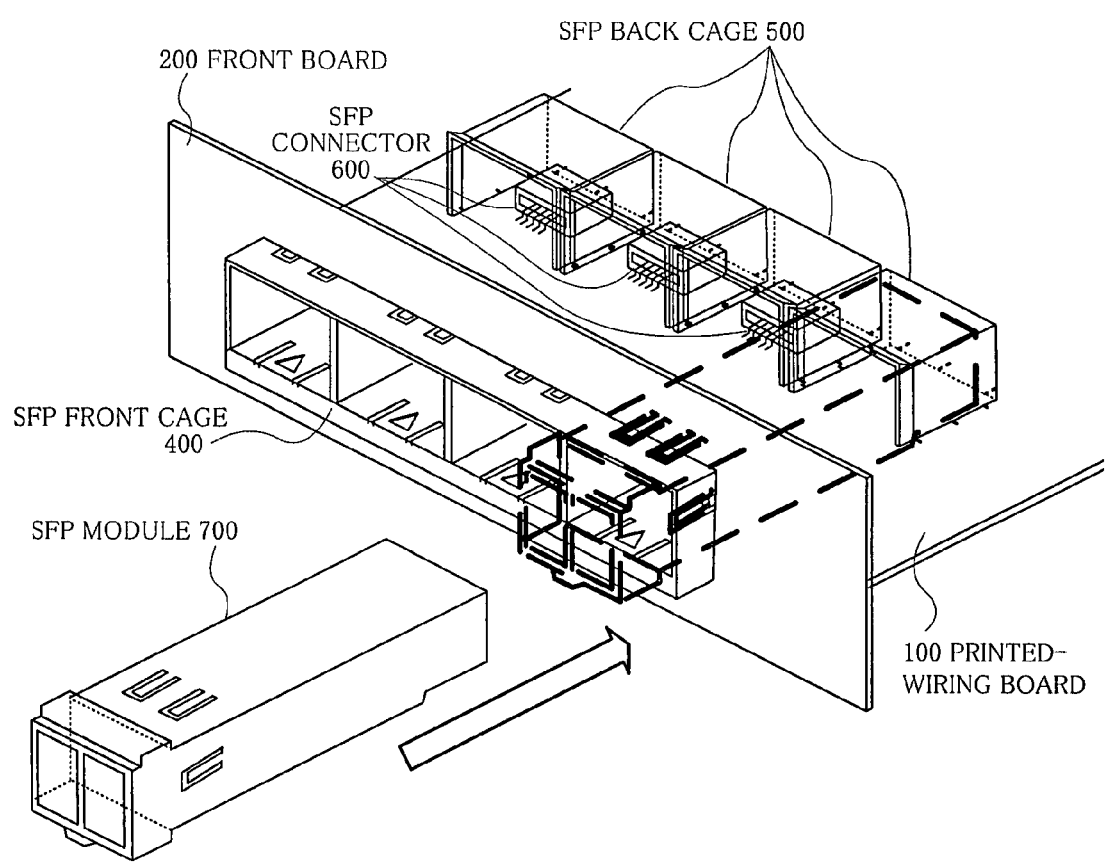
FIG. 7 is a diagram showing an SFP front cage mounting example of an embodiment [1] of a connector mounting structure according to the present invention.

Also, as shown in FIG. 6B, by fitting the locks 330_1 and 330_2 of the modular connector 300 to the lock grooves 150_1 and 150_2 of the printed-wiring board 100, the modular connector 300 is fixed to the printed-wiring board 100.

It is to be noted that the lock groove 150 and the lock 330 are not essential, and that they may be provided in a case where the modular connector 300 is required to be more strongly fixed to the printed-wiring board 100.

I. 3. Assembling Process Example (3) Upon Mounting SFP Front Cage: FIGS. 7, 8A-8C, 9A, and 9B FIG. 7 shows a state in which an SFP front cage 400 is inserted into the opening 210 of the front board 200 in order to use the SFP connector 600 after the assembling work described in the common assembling process example (1) of FIGS. 1A and 1B.

When the SFP module 700 is inserted into the front board 200 in this state, the SFP module 700 is connected to the SFP connector 600 through the SFP front cage 400 and the back cage 500, and is supported by the SFP front cage 400 and the SFP back cage 500. However, as described above, the SFP back cage 500 is not essential.

Figure 8A:
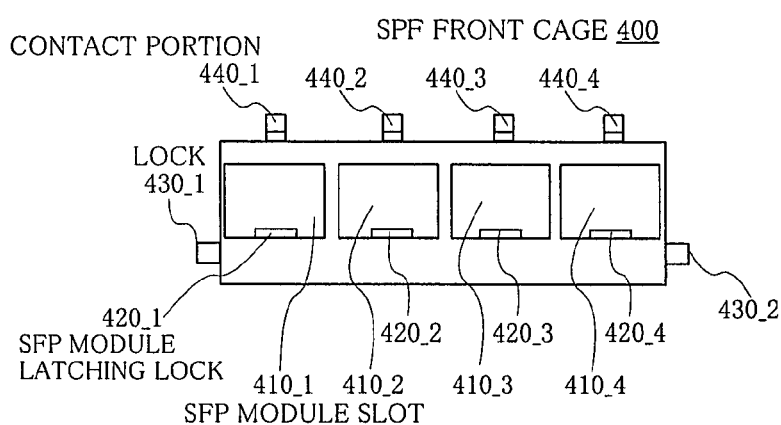
FIGS. 8A-8C are diagrams showing an arrangement of an SFP front cage used for an embodiment [1] of a connector mounting structure according to the present invention.
Figure 8B:
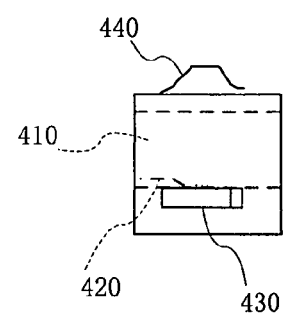
Figure 8C:
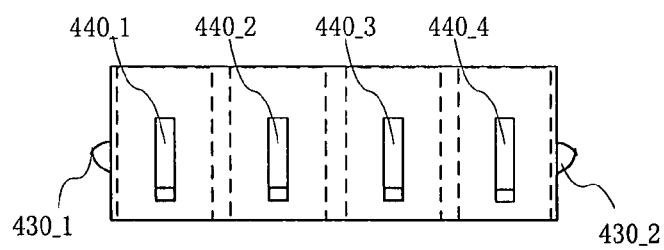

The SFP front cage 400 is composed of, as shown in FIGS. 8A-8C as an example, SFP module latching locks 420_1-420_4 (hereinafter, occasionally represented by a reference numeral 420) for latching the SFP module 700 inserted respectively from four slots 410_1-410_4 (hereinafter, occasionally represented by a reference numeral 410), locks 430_1 and 430_2 (hereinafter, occasionally represented by a reference numeral 430) provided so as to be fitted to the lock grooves 150_1 and 150_2 of the printed-wiring board 100, and four contact portions 440_1-440_4 (hereinafter, occasionally represented by a reference numeral 440) provided corresponding to the slots 410_1-410_4 and for electrically being contacted with the front board 200.

It is to be noted that when the SFP back cage 500 is mounted on the printed-wiring board 100 and the plate spring 520 is provided on the SFP back cage 500 (namely, when the SFP module 700 pushed back by the plate spring 520 is latched), the SFP module latching lock 420 may be provided.

Figure 9A:
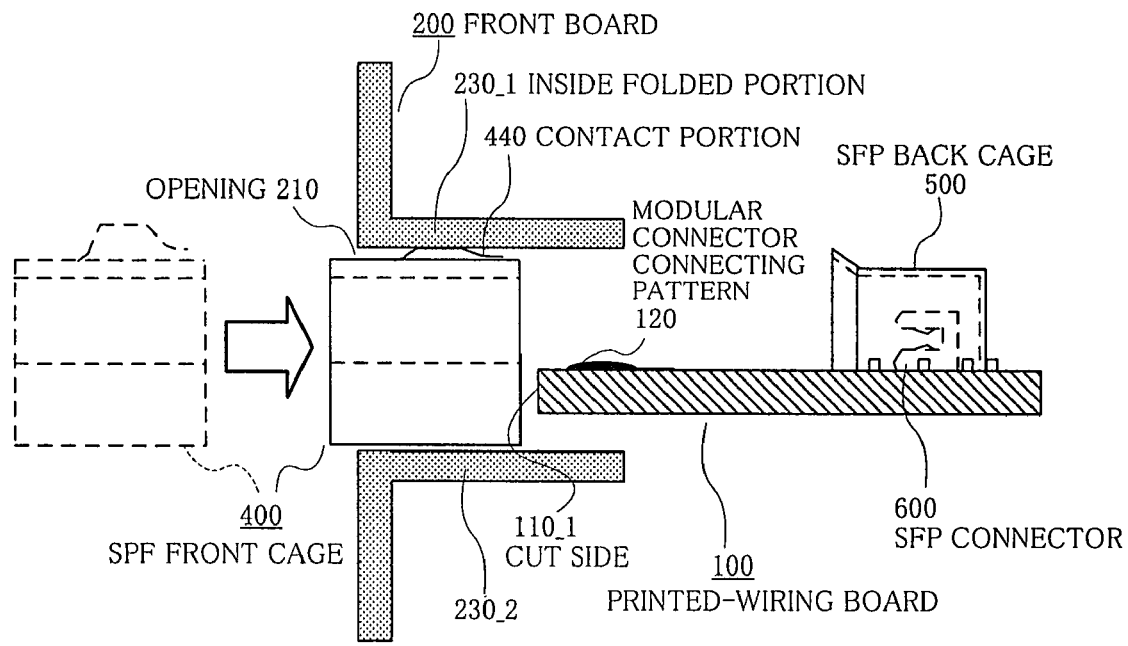
FIGS. 9A and 9B are diagrams showing an assembling process example (3) of an embodiment [1] of a connector mounting structure according to the present invention.

In the assembling process, as shown in FIG. 9A, when the SFP front cage 400 is inserted into the opening 210 of the front board 200, the SFP front cage 400 abuts on the cut side 110_1 of the printed-wiring board 100, so that the SFP front cage 400 is supported by the cut portion 110 in the horizontal direction in which the printed-wiring board 100 is extended. As for the vertical direction, the inside folded portions 230_1 and 230_2 of the opening 210 support the SFP front cage 400 to be sandwiched from above and below. Also, as shown in FIG. 9A, the contact portion 440 assumes a state electrically contacting with the front board 200.

It is to be noted that in the same way as the above-mentioned assembling process example (2), the contact portion 440 is not essential for the support of the SFP front cage 400 and may be provided when the EMC function is required to be achieved.

Figure 9B:
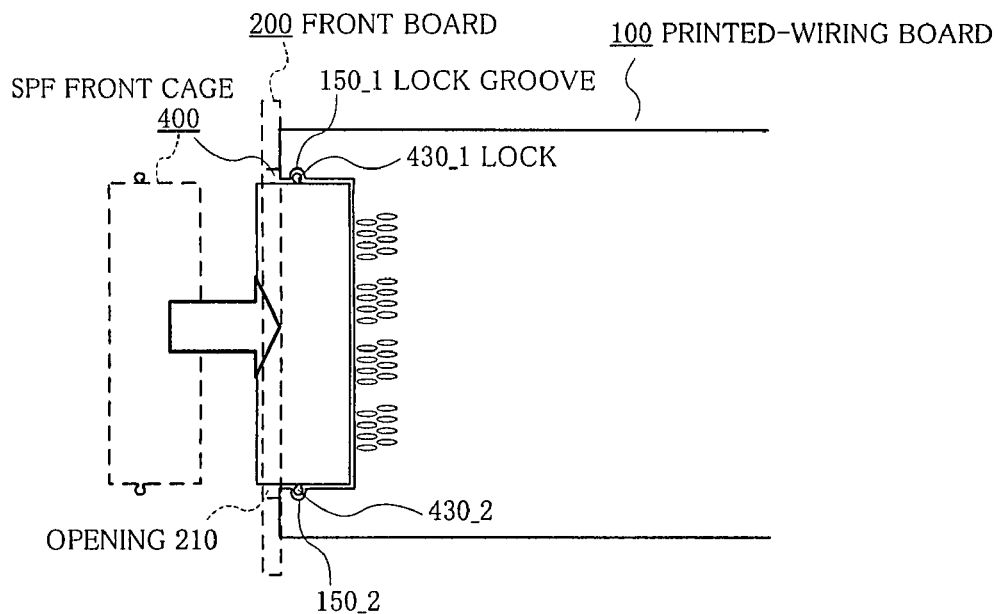

Also, as shown in FIG. 9B, by fitting the locks 430_1 and 430_2 of the SFP front cage 400 to the lock groves 150_1 and 150_2 of the printed-wiring board 100, the SFP front cage 400 is fixed to the printed-wiring board 100.

It is to be noted that in the same way as the above-mentioned assembling process (2) the lock groove 150 and the lock 430 are not essential, and may be provided when the SFP front cage 400 is required to be more strongly fixed to the printed-wiring board 100.

It is to be noted that in this embodiment the printed-wiring board 100 has a quadruple series arrangement, where four modular connector connecting patterns 120_1-120_4 and four SFP connector connecting patterns 130_1-130_4 are provided, and accordingly four modular plug slots 310_1-310_4 and four SFP module slots 410_1-410_4 respectively are provided to the modular connector 300 and the SFP front cage 400. However, as a matter of course, this arrangement may be single, double, triple, quintuple, or more. The above-mentioned description is similarly applied to all of those cases. Also, the same applies to the embodiments [2] and [3] which will be described later.

II. Embodiment [2] (Concurrent Mounting of Modular Connector and SFP Front Cage): FIGS. 10, 11A-11D, 12A-12C, and 13

Figure 10:
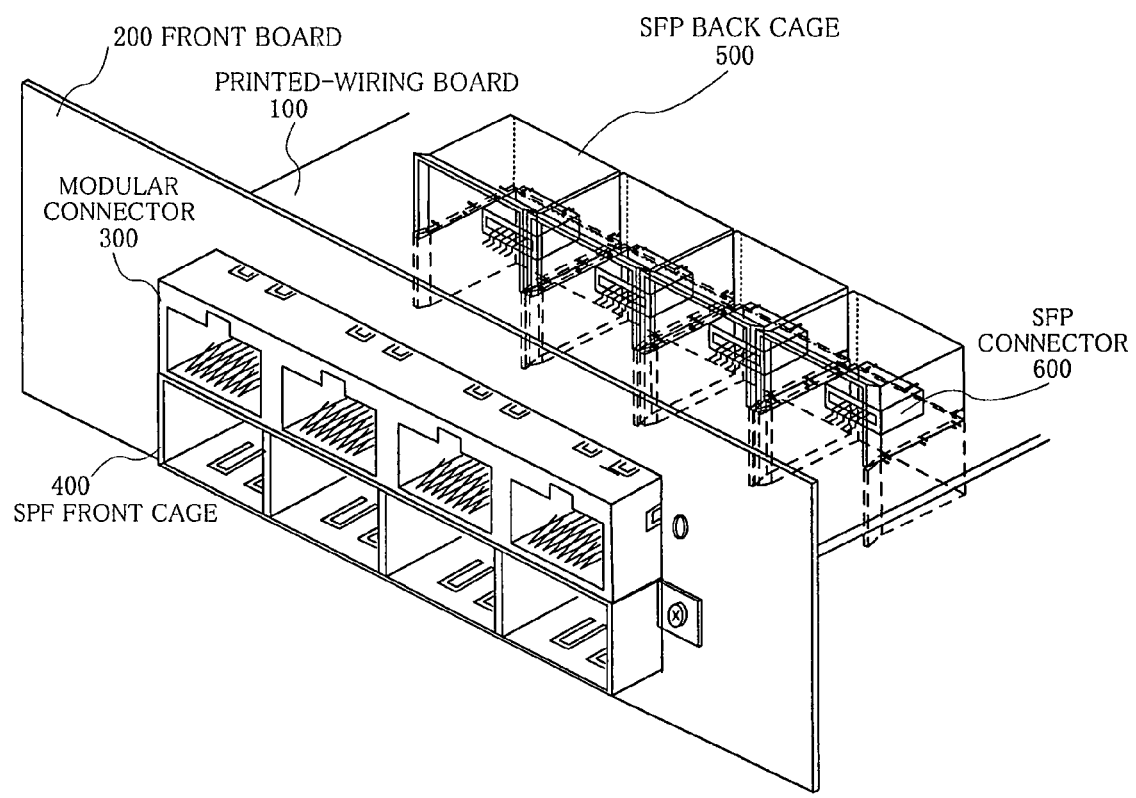
FIG. 10 is a diagram showing an embodiment [2] of a connector mounting structure according to the present invention.

FIG. 10 shows an embodiment of a connector mounting structure which concurrently mounts thereon the modular connector 300 and the SFP front cage 400.

In the printed-wiring board 100 used in this embodiment, modular connector connecting patterns 120_1R-120_4R (hereinafter, occasionally represented by a reference numeral 120R) and the SFP connector connecting patterns 130_1R-130_4R (hereinafter, occasionally represented by a reference numeral 130R) which are the same as those provided in FIG. 11A are provided on the back side of the printed-wiring board 100 as shown in FIG. 11B, so that it is made possible that the modular connector 300 and the SFP connector 600 are mounted on both sides of the printed-wiring board 100, different from the above-mentioned embodiment [1].

Also, different from the above-mentioned embodiment [1], the front board 200, as shown in FIGS. 11C and 11D, has screw holes 240_1-240_4 (hereinafter, occasionally represented by a reference numeral 240) for fixing the SFP front cage 400, which will be described later, the height of the opening 210 is deformed so that the modular connector 300 and the SFP front cage 400 in the stack structure may be concurrently inserted thereinto, and the positions of the screw holes 220_1 and 220_2 are adjusted so that the cut portion 110 of the printed-wiring board 100 may face the center line of the opening 210.

It is to be noted that the combining of the front board 200 and the SFP front cage 400 can be performed by not only the screw combining but also various combining members.

Figure 12A:
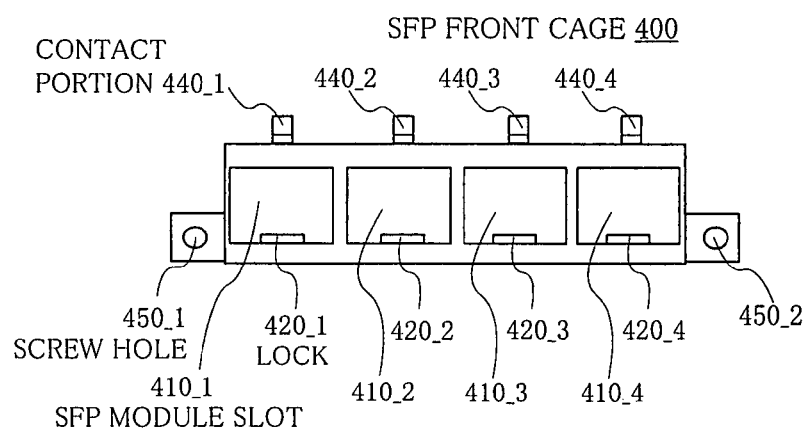
FIGS. 12A-12C are diagrams showing an arrangement of an SFP front cage used for an embodiment [2] of a connector mounting structure according to the present invention.
Figure 12B:
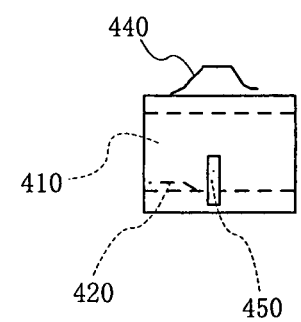
Figure 12C:
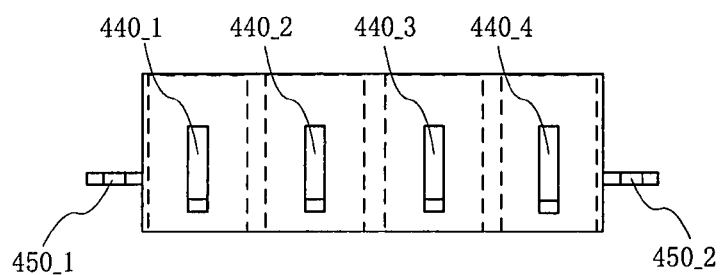

Also, different from the above-mentioned embodiment [1], as shown in FIGS. 12A-12C, the thickness under the slot 410 is made thinner compared with that shown in FIGS. 3A-3D so that the modular connector 300 and the SFP front cage 400 can be concurrently inserted into the opening 210, and screw holes 450_1 and 450_2 (hereinafter, occasionally represented by a reference numeral 450) are provided so as to be combined with the screw holes 240_1 and 240_2, or 240_3 and 240_4 on the front board 200, substituting for the locks 430_1 and 430_2.

It is to be noted that the same modular connector 300, SFP connector 600, and SFP back cage 500 as those in the above-mentioned embodiment [1] can be used.

Figure 13:
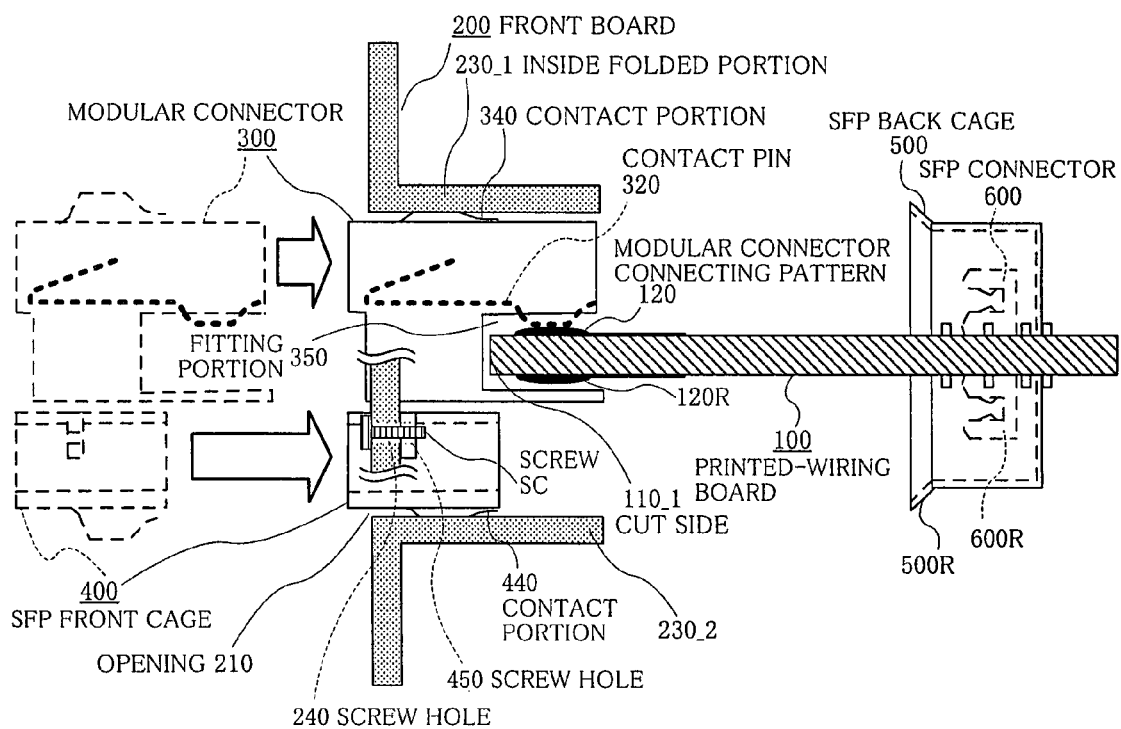
FIG. 13 is a diagram showing an assembling process example of an embodiment [2] of a connector mounting structure according to the present invention.

In the assembling process, the front board 200 in which the position of the screw hole 220 shown in FIG. 11B is adjusted is combined with the printed-wiring board 100 in the same way as the above-mentioned embodiment [1]. Thus, as shown in FIG. 13, the cut portion 110 of the printed-wiring board 100 faces the center line of the opening 210 in the front board 200.

Also, in addition to the above-mentioned embodiment [1], an SFP back cage 50OR and an SFP connector 600R are also mounted on an SFP connector connecting pattern 130R provided on the back side of the printed-wiring board 100.

The modular connector 300 and the SFP front cage 400 are made a stack structure, and are concurrently inserted into the opening 210 of the front board 200. At this time, the modular connector 300 is supported by the cut portion 110 in the horizontal direction on which the printed-wiring board 100 extends in the same way as the above-mentioned embodiment [1]. However, different from the above-mentioned embodiment [1], the inside folded portion 230_1 of the opening 210 and the bottom of the SFP front cage 400 support the modular connector 300 in the vertical direction.

At this time, in the same way as the above-mentioned embodiment [1], the fitting portion 350 sandwiches the printed-wiring board 100, whereby the contact pin 320 is electrically contacted with the modular connector connecting pattern 120, so that the contact portion 340 assumes a state electrically contacting with the front board 200.

Also, while not shown in the figure, by fitting the lock 330 of the modular connector 300 to the lock groove 150 of the printed-wiring board 100, the modular connector 300 is fixed to the printed-wiring board 100 in the same way as the above-mentioned embodiment [1]. However, this is not essential as mentioned above.

On the other hand, the SFP front cage 400 is supported by the inside folded portion 230_2 of the opening 210 and the bottom of the modular connector 300 in the vertical direction. At this time, the contact portion 440 assumes a state electrically contacting with the front board 200.

Also, as for the horizontal direction, since the SFP front cage 400 can not be abutted on the cut side 110_1 of the printed-wiring board 100 as shown, the screw hole 450 and the screw hole 240 of the front board 200 are combined by the screw SC to be fixed.

However, the screw combination of the front board 200 and the SFP front cage 400 is not essential. If only a simple process such as preliminarily combining the modular connector 300 and the SFP front cage 400 which are made the stack structure is performed, the combining screw holes 240 and 450 provided on the front board 200 and the SFP front cage 400 respectively, and the screw SC become unnecessary.

III. Embodiment [3] (Alternative Mounting of Either Modular Connector or SFP Front Cage in 2-Tire Structure): FIGS. 14A, 14B, 15A-15D, 16, 17A-17C, and 18

Figure 14A:
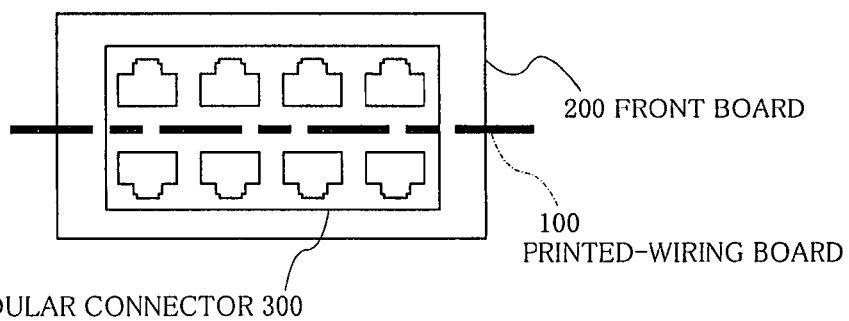
FIGS. 14A and 14B are diagrams showing an embodiment [3] of a connector mounting structure according to the present invention.
Figure 14B:
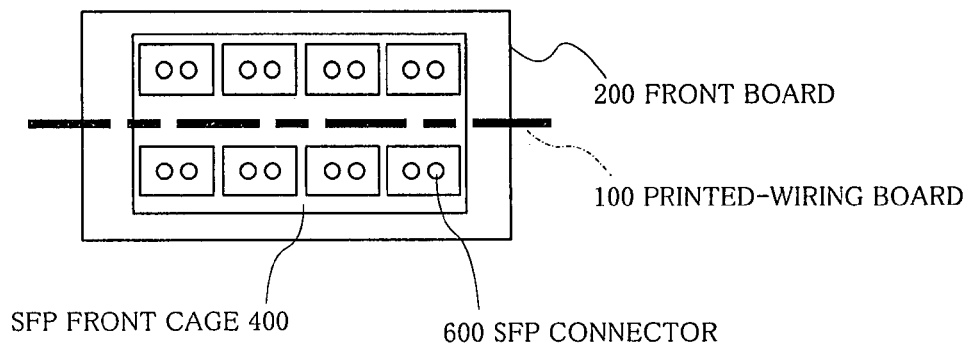

FIGS. 14A and 14B show an embodiment of a connector mounting structure which alternatively mounts the modular connector 300 or the SFP front cage 400 in a 2-tire structure.

Hereinafter, an assembling process example (1) in a case where the modular connector 300 is mounted will be described referring to FIGS. 15A-15D and 16, and then an assembling process example (2) in a case where the SFP front cage 400 is mounted will be described referring to FIGS. 17A-17C, and 18.

It is to be noted that since the same printed-wiring board 100, SFP connector 600, front board 200, and SFP back cage 600 as those of the above-mentioned embodiment [2] are used, the description of the assembling process for those portions will be omitted.

III. 1. Assembling Process Example (1) Upon Mounting Modular Connector in 2-Tire Structure: FIGS. 15A-15D and 16

The modular connector 300 used in this embodiment is made a 2-tire structure, different from the above-mentioned embodiments [1] and [2], where an upper stage is composed of the modular plug slots 310_1-310_4, the contact pins 320_1-320_4, and the contact portions 340_1-340_4 and a lower stage is composed of modular plug slots 310_1R-310_4R) contact pins 320_1R-320_4R (hereinafter, occasionally represented by a reference numeral 320R), and contact portions 340_1R-340_4R (hereinafter, occasionally represented by a reference numeral 340R) provided symmetric to the upper stage as shown in FIGS. 15A-15D.

Figure 15A:
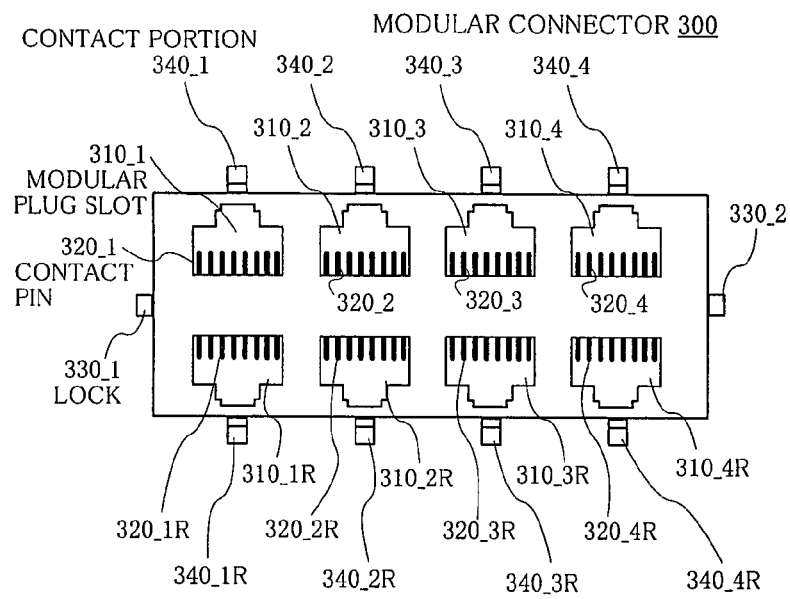
FIGS. 15A-15D are diagrams showing an arrangement of a modular connector used for an embodiment [3] of a connector mounting structure according to the present invention.
Figure 15B:
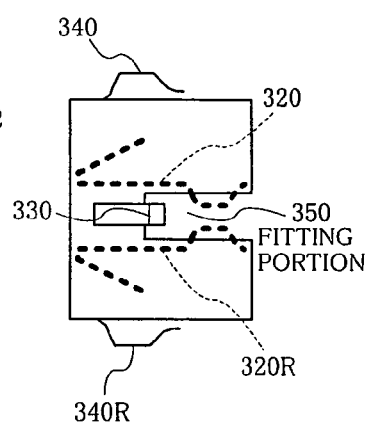
Figure 15C:
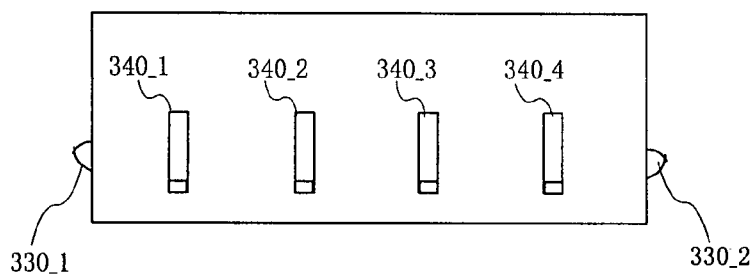
Figure 15D:
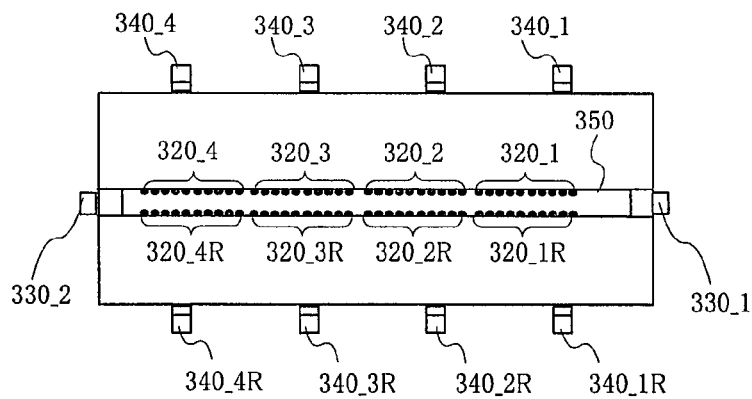

Also, as shown in FIG. 15B, the contact pin 320R has the same form as the contact pin 320, and a part of the contact pin 320R is pulled out from the under surface of the fitting portion 350 so as to be contactable with the modular connector connecting pattern 120R provided on the back side of the printed-wiring board 100.

Figure 16:
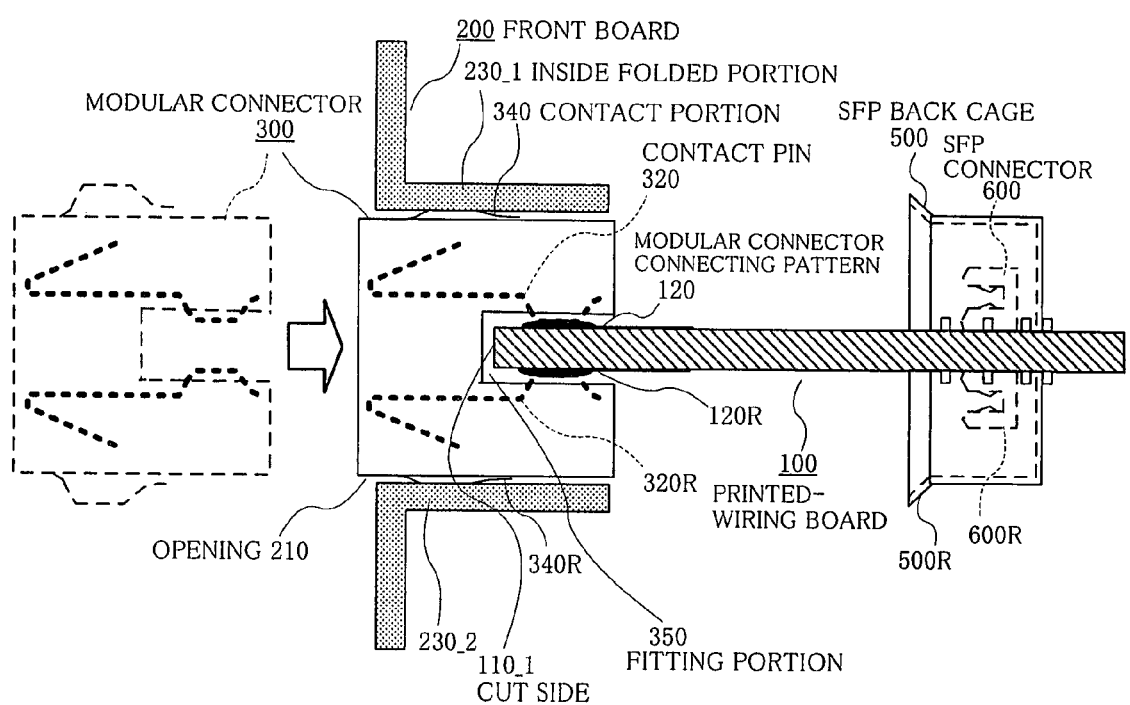
FIG. 16 is a diagram showing an assembling process example (1) of an embodiment [3] of a connector mounting structure according to the present invention.

In the assembling process, as shown in FIG. 16, when the modular connector 300 is inserted into the opening 210 of the front board 200, the modular connector 300 is supported by the cut portion 110 and the opening 210 in the same way as the above-mentioned embodiment [1].

At this time, in the same way as the above-mentioned embodiment [1], the fitting portion 350 sandwiches the printed-wiring board 100, whereby the contact pins 320 and 320R are electrically contacted with the modular connector connecting patterns 120 and 120R respectively, so that both of the contact portions 340 and 340R are electrically contacted with the front board 200.

III. 2.2. Assembling Process Example (2) Upon Mounting SFP Front Cage in 2-Tire Structure: FIGS. 17A-17C, and 18

Figure 17A:
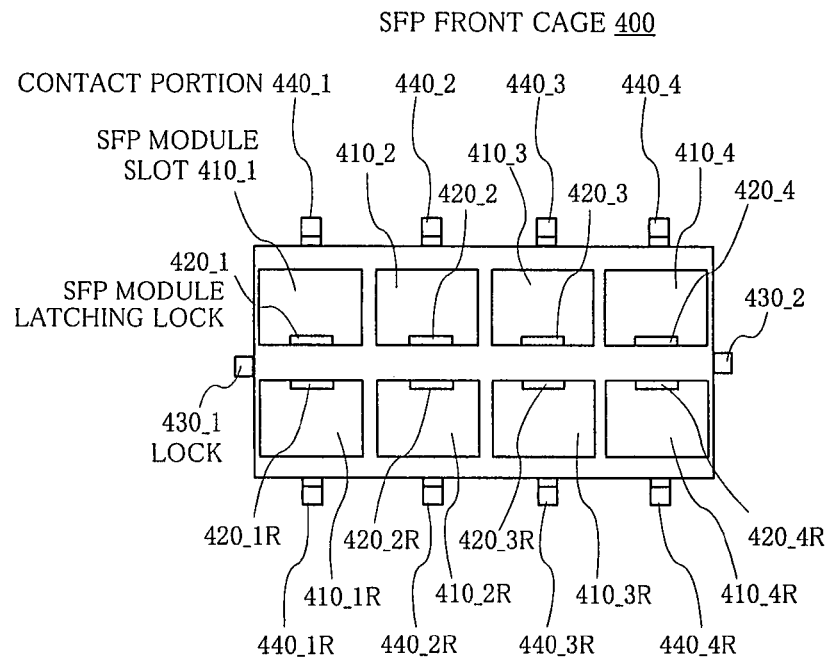
FIGS. 17A-17C are diagrams showing an arrangement of an SFP front cage used for an embodiment [3] of a connector mounting structure according to the present invention.
Figure 17B:
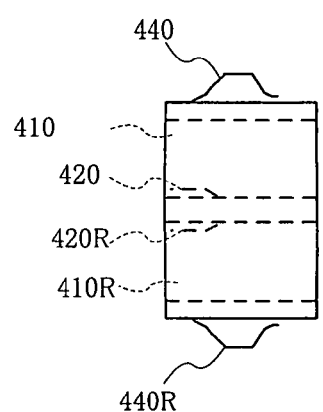
Figure 17C:
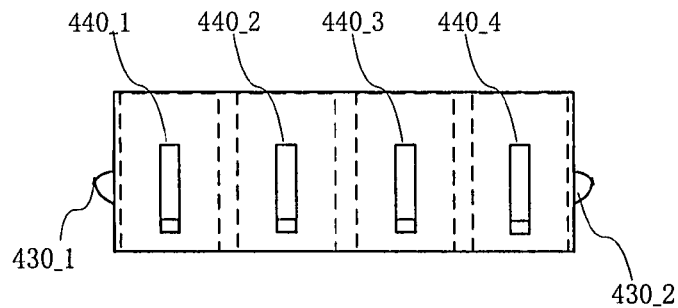

The SFP front cage 400 used in this embodiment is made a 2-tire structure, different from the above-mentioned embodiments [1] and [2], where the upper stage is composed of the SFP module slots 410_1-410_4, the SFP module latching locks 420_1-420_4, and the contact portions 440_1-440_4, and the lower stage is composed of SFP module slots 410_1R-410_4R (hereinafter, occasionally represented by a reference numeral 410R), SFP module latching locks 420_1R-420_4R (hereinafter, occasionally represented by a reference numeral 420R), and contact portions 440_1R-440_4R (hereinafter, occasionally represented by a reference numeral 440R) provided symmetric to the upper stage as shown in FIGS. 17A-17C.

Figure 18:
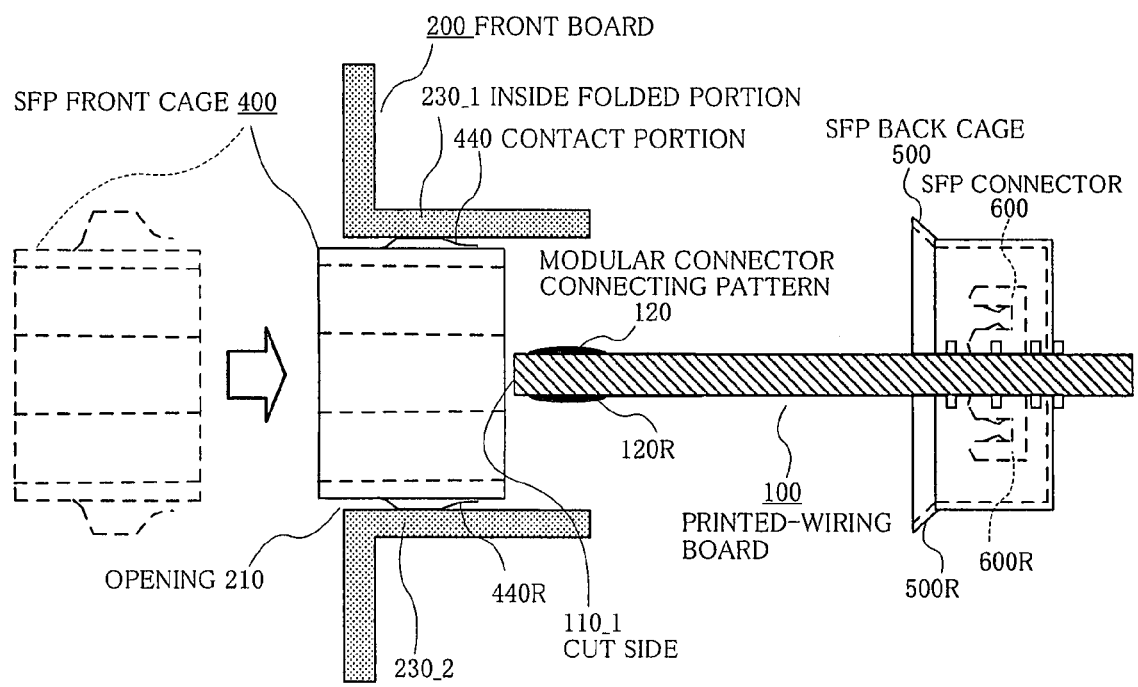
FIG. 18 is a diagram showing an assembling process example (2) of an embodiment [3] of a connector mounting structure according to the present invention.
Figure 19:
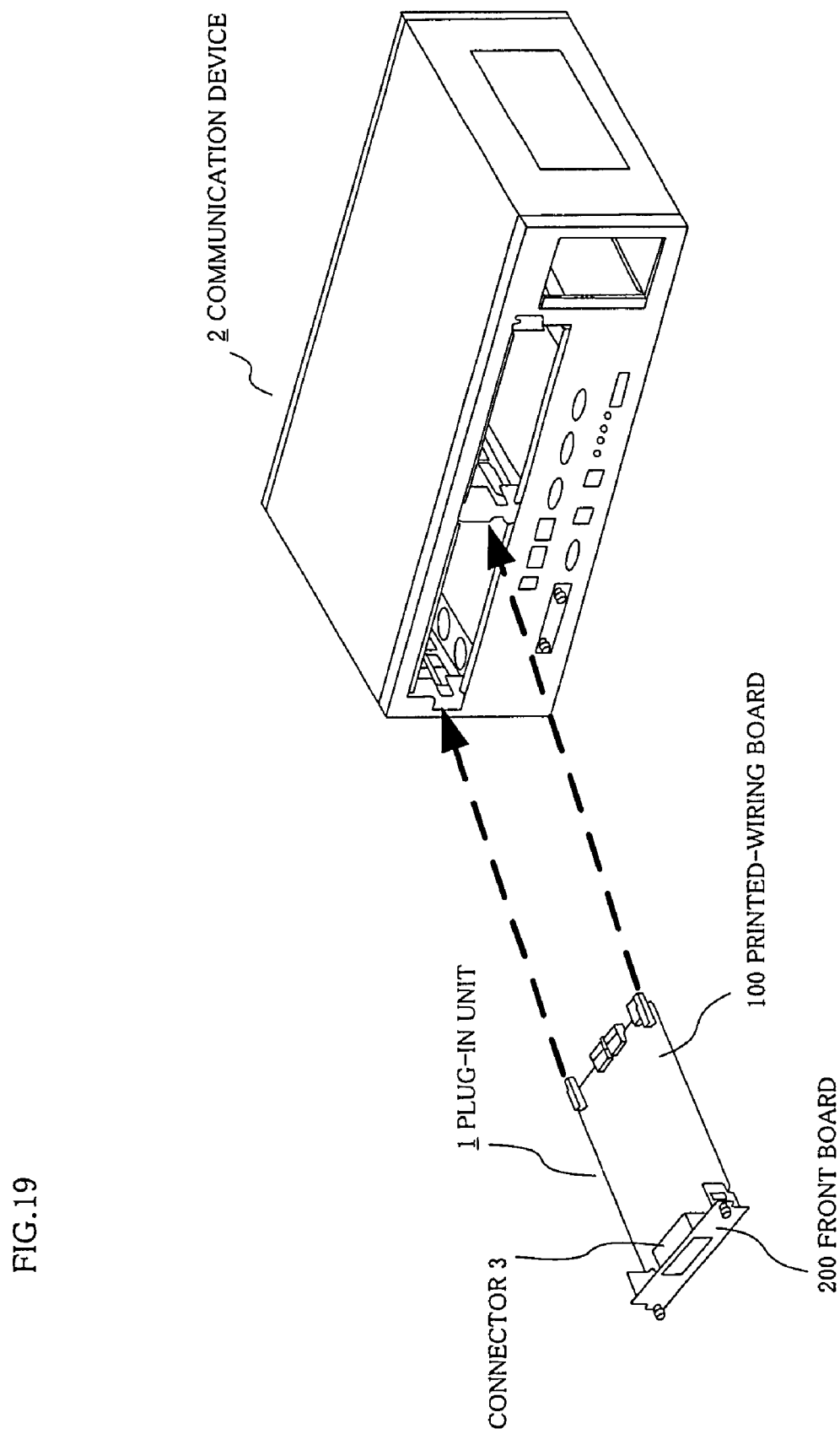
FIG. 19 is a diagram showing an arrangement of a device to which the present invention and the prior art example are applied.
Figure 20A:
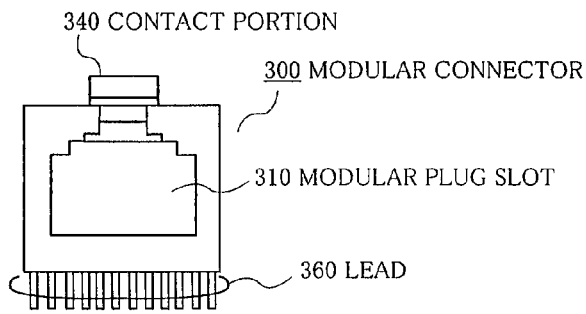
FIGS. 20A-20D are diagrams showing a prior art example [1] of a connector mounting technology.
Figure 20B:
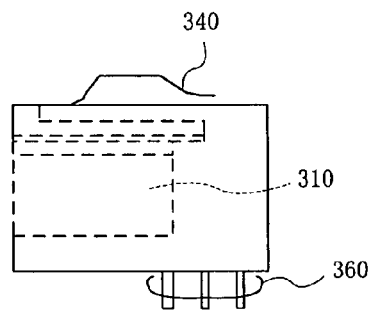
Figure 20C:
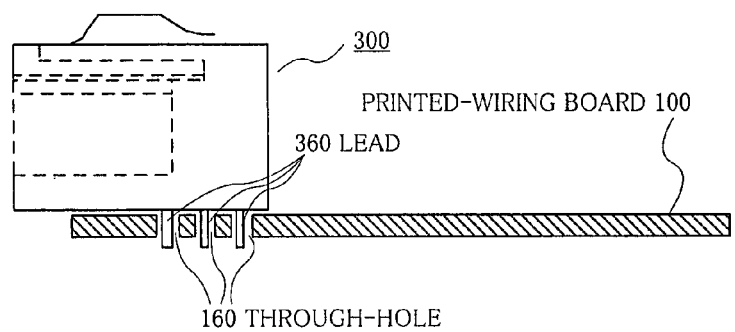
Figure 20D:
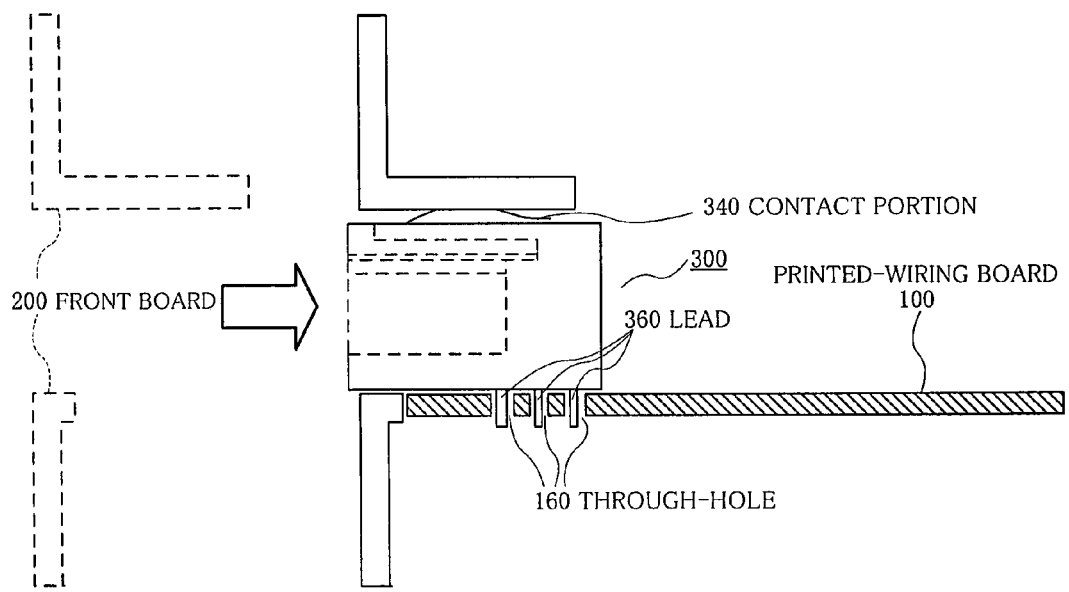
Figure 21A:
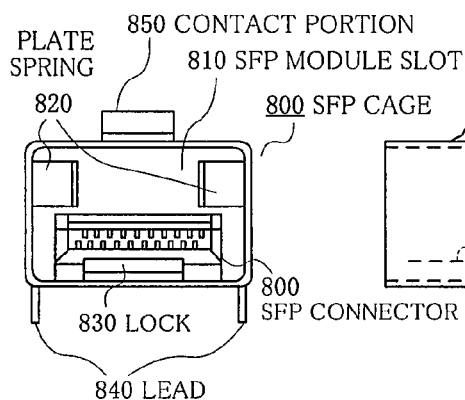
FIGS. 21A-21D are diagrams showing a prior art example [2] of a connector mounting technology.
Figure 21B:
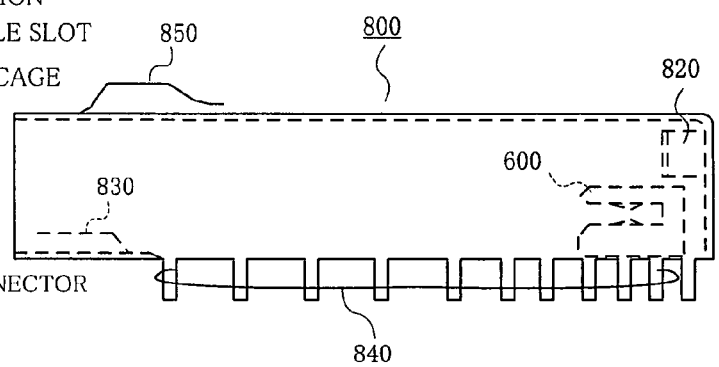
Figure 21C:
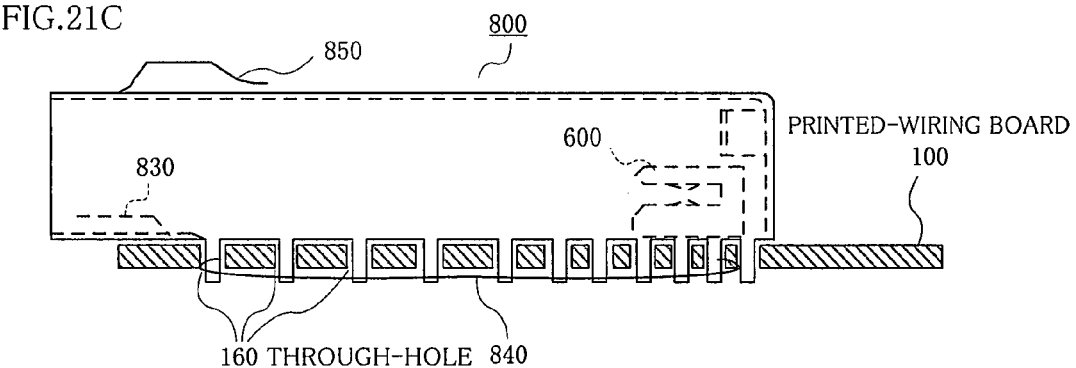
Figure 21D:
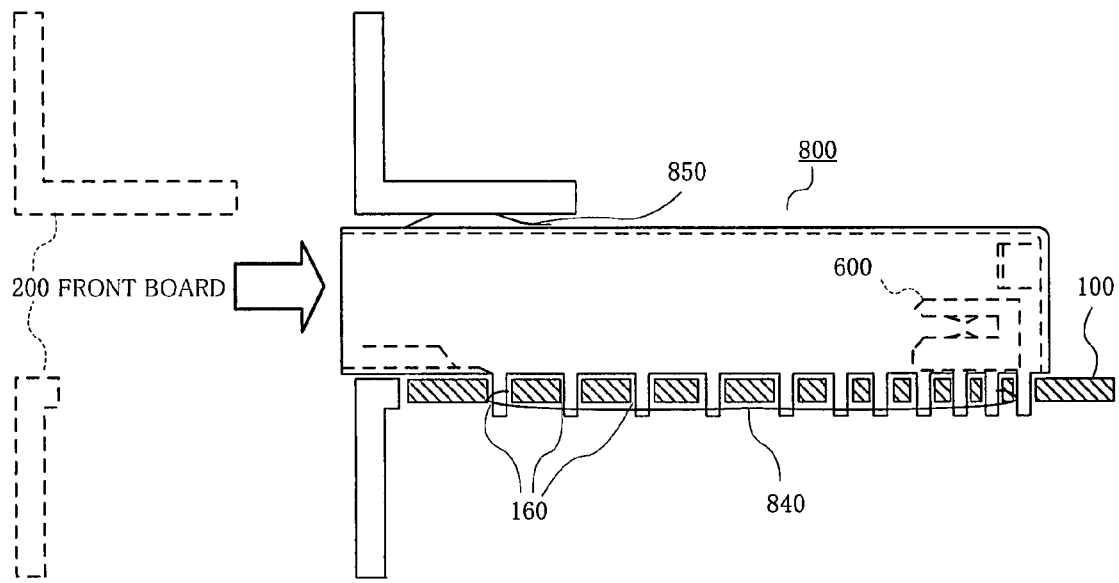
Figure 22A:
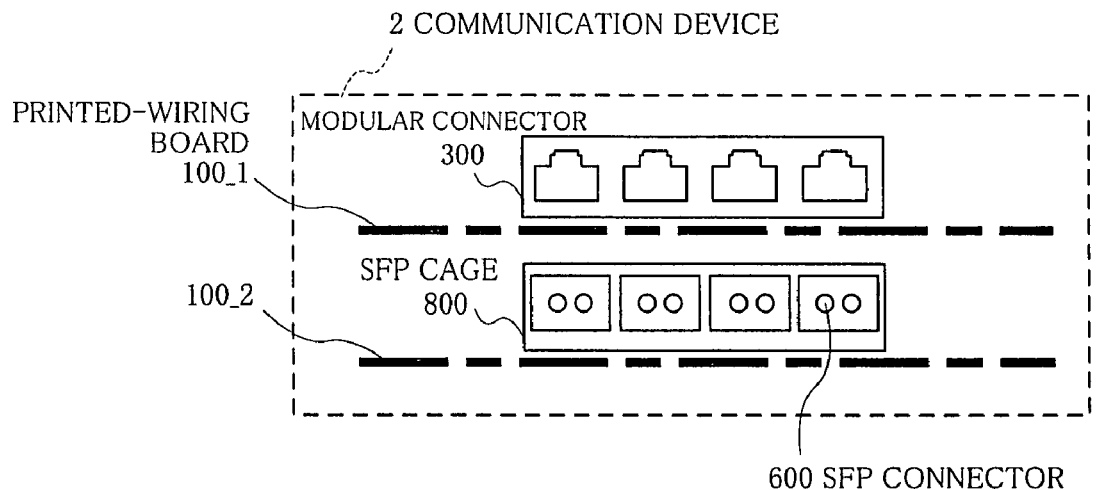
FIGS. 22A and 22B are diagrams showing an example where a prior art modular connector and SFP connector are mixed and mounted.
Figure 22B:
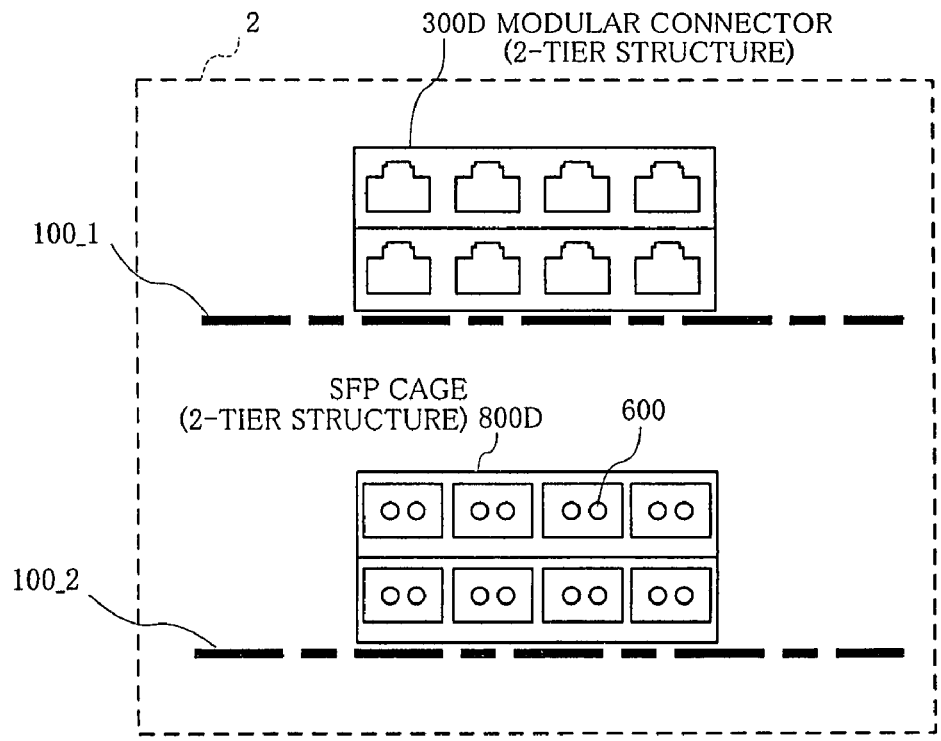

In the assembling process, as shown in FIG. 18, when the SFP front cage 400 is inserted into the opening 210 of the front board 200, the SFP front cage 400 is supported by the cut portion 110 and the opening 210 in the same way as the above-mentioned embodiment [1], and the contact portions 440 and 440R assume a state of being electrically contacted with the front board 200.

It is to be noted that the present invention is not limited by the above-mentioned embodiments, and it is obvious that various modifications may be made by one skilled in the art based on the recitation of the claims.

What is claimed is:

1. A connector mounting structure comprising:
   a printed-wiring board having a cut portion, a modular connector connecting pattern provided adjacent to the cut portion, and an SFP connector mounted isolated from the modular connector connecting pattern; and
   a front board having an opening, and combined with the printed-wiring board in order that the cut portion faces a plane of the opening;
   wherein when a modular connector is inserted into the opening, the modular connector is supported by the opening and the cut portion and concurrently the modular connector is electrically contacted with the modular connector connecting pattern, and when an SFP front cage is inserted into the opening, the SFP front cage is supported by the opening and the cut portion and concurrently an SFP module becomes connectable to the SFP connector through the SFP front cage.

2. The connector mounting structure as claimed in claim 1, wherein the printed-wiring board has the modular connector connecting pattern and the SFP connector on each side of the printed-wiring board, and
   the cut portion faces a center line of the opening, thereby enabling a stack structure of the modular connector and the SFP front cage or a two-tier structure of the modular connector or the SFP front cage integrated.

3. The connector mounting structure as claimed in claim 1, wherein the cut portion has a lock groove, and the cut portion supports the modular connector or the SFP front cage by fitting a lock provided either in the modular connector or the SFP front cage to the lock groove.

4. The connector mounting structure as claimed in claim 1, wherein the front board is combined with the modular connector or the SFP front cage by a combining member.

5. The connector mounting structure as claimed in claim 1, wherein the modular connector or the SFP front cage has a contact portion which is electrically contactable with the opening.

6. The connector mounting structure as claimed in claim 1, wherein an SFP back cage which supports the SFP module circumferentially when the SFP module is connected to the SFP connector is further mounted on the printed-wiring board.

7. The connector mounting structure as claimed in claim 6, wherein the SFP back cage has a plate spring generating repulsion which pushes back the SFP module toward the SFP front cage, and the SPF front cage has a lock which latches the SFP module pushed back by the repulsion.

8. The connector mounting structure as claimed in claim 6, wherein the SFP connector has a lead to be soldered to the printed-wiring board, and the SFP back cage has a window for examining whether or not the lead is soldered to the printed-wiring board.

* * * * *